(No Model.)

G. L. RUSH.
NUT AND BOLT LOCK.

No. 528,990. Patented Nov. 13, 1894.

Witnesses
G. T. Myers
J. M. Witherow

Inventor
George L. Rush
By Joseph N. Atkins
Attorney

UNITED STATES PATENT OFFICE.

GEORGE L. RUSH, OF DODGE, TEXAS.

NUT AND BOLT LOCK.

SPECIFICATION forming part of Letters Patent No. 528,990, dated November 13, 1894.

Application filed December 19, 1893. Serial No. 494,017. (No model.)

*To all whom it may concern:*

Be it known that I, GEORGE L. RUSH, of Dodge, county of Walker, State of Texas, have invented certain new and useful Improvements in Bolt and Nut Fasteners, of which the following is a specification, reference being had to the accompanying drawings.

The object of my invention is to produce an improved device for fastening a bolt and nut in position, whereby the tendency of the bolt or nut to become displaced under jar or strain is obviated.

Figure 1:
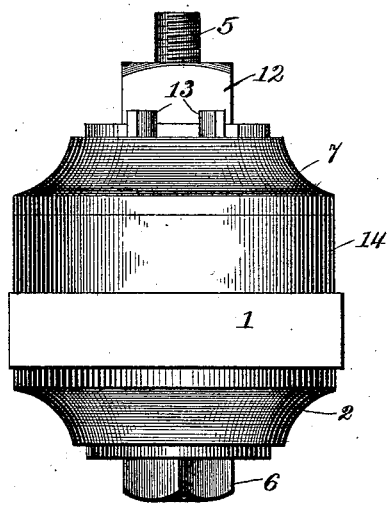
Figure 2:
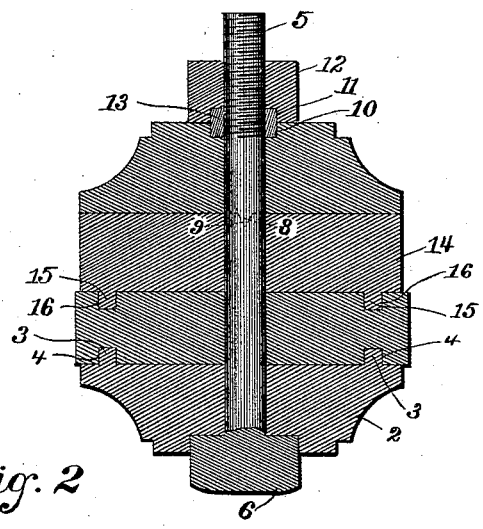

In the accompanying drawings: Figure 1 is a side elevation of a section of timber, showing a bolt and nut with my appliance in place; and also illustrating an extra washer in place upon the bolt. Fig. 2 is a vertical section of the same.

Referring to the figures on the drawings: 1 indicates a section of timber which is illustrated for the purposes of explanation.

2 indicates a washer provided, on its under side, with means for securing it to the timber, as for example, projections 3 adapted to enter recesses 4 in the timber.

5 indicates a bolt whose head 6 is sunk in the top of the washer 2. The washer being immovable, the bolt is prevented from rotating when set in position.

7 indicates a nut washer provided with projecting points 8 adapted to enter recesses 9 in the timber, or other part to which it is to be secured. The head of the washer is cut by parallel transverse grooves 10, with which similar grooves 11, on the inner edge of a nut 12, are adapted to register. When the bolt is secured in place and the washer 7 is pressed firmly in position by the nut, a resilient loop key 13 is inserted into the grooves in the head of the washer which by its resiliency is secured in place. The bolt, washers, and nut are thereby all firmly united together in a manner capable of resisting all tendency to displacement, except by removal of the key.

When it is desired to adapt a long bolt to a thinner timber, or the like, than that for which it is intended, a washer 14 may be employed having on one side projections 15 adapted to enter the recesses 16 in the timber, and on the other side recesses 9 adapted to receive the projections 8 of the washer 7.

What I claim is—

1. The combination with a bolt, of a washer provided with retaining projections upon one face and with an angular recess in its opposite face adapted to secure the head of the bolt, a second washer centrally apertured to receive the bolt and provided with retaining lugs upon one face, and parallel transverse grooves in its opposite face upon opposite sides of and immediately adjacent to the central bolt aperture, a nut provided with a bolt aperture and parallel grooves correlative with the grooves in the second washer, and a resilient loop key adapted to be inserted in the grooves in the washer and nut and to be secured therein by its resiliency substantially as specified.

2. The combination with a bolt and a washer, provided with retaining projections upon one face and a bolt head retaining recess in its opposite face, of a second washer provided with retaining projections upon one face and transverse parallel grooves upon its opposite face, a nut provided with parallel grooves correlative with the grooves in the second washer, a resilient loop key adapted to secure the nut to the washer and an intermediate washer, provided upon its opposite faces, respectively with retaining projections and recesses, substantially as specified.

In testimony of all which I have hereunto subscribed my name.

GEORGE L. RUSH.

Witnesses:
T. H. BALL,
OTIS E. RUSH.